J. H. GOODIER.
COMBINED STREET INDICATOR AND ADVERTISING DEVICE.
APPLICATION FILED JULY 29, 1907.
940,963.
Patented Nov. 23, 1909.
4 SHEETS—SHEET 1.
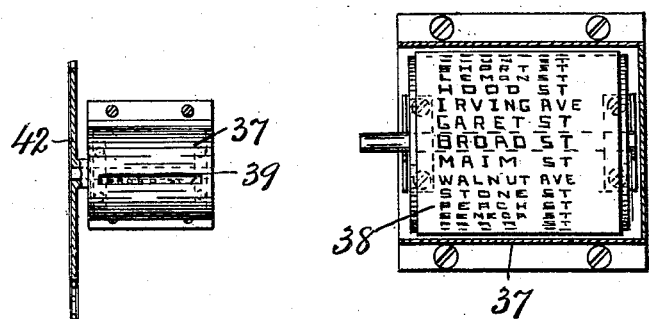
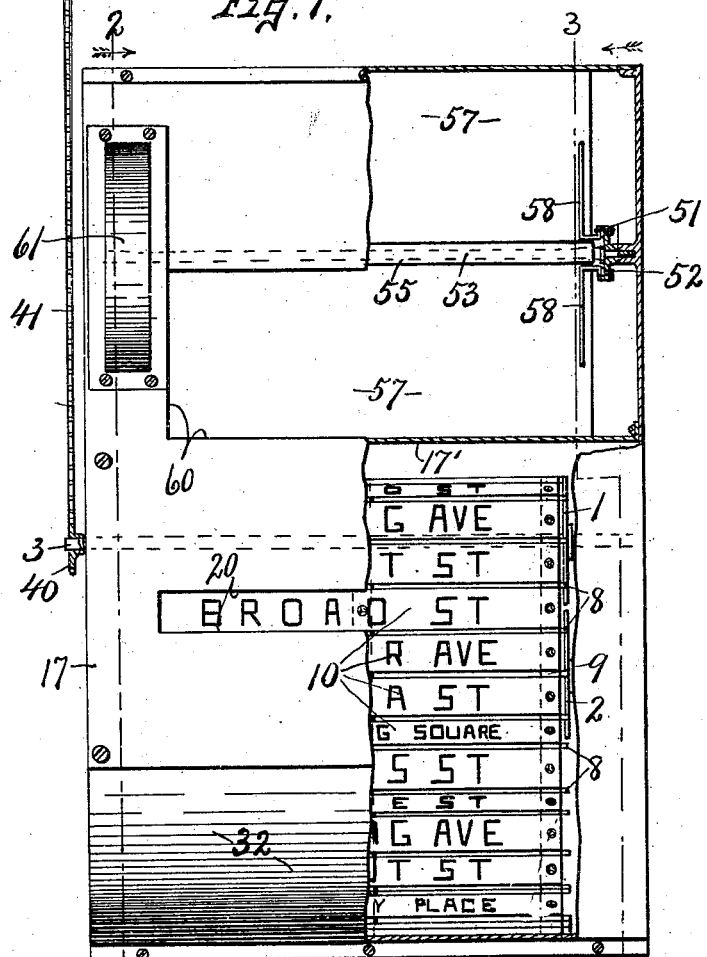

J. H. GOODIER.
COMBINED STREET INDICATOR AND ADVERTISING DEVICE.
APPLICATION FILED JULY 29, 1907.
940,963.
Patented Nov. 23, 1909.
4 SHEETS—SHEET 2.
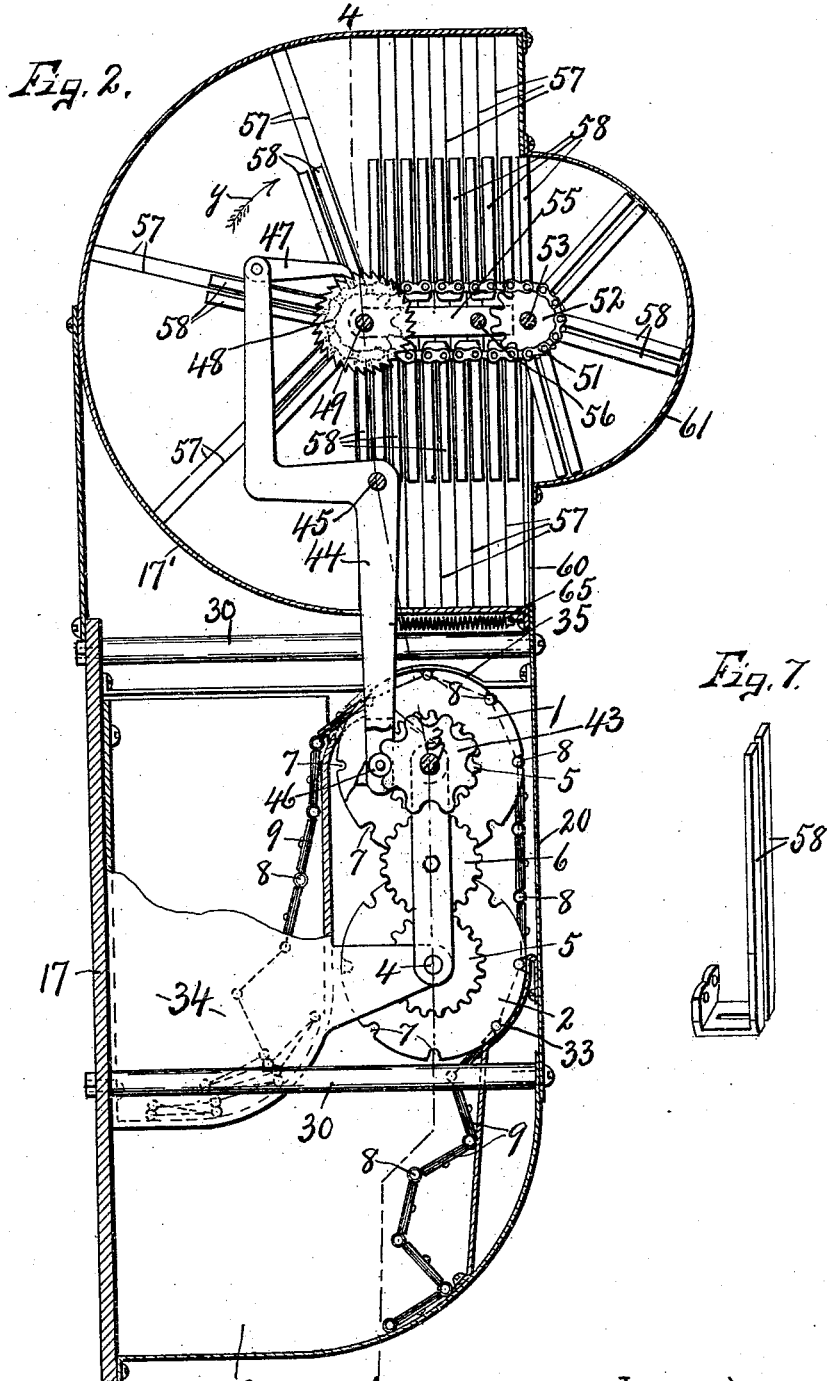

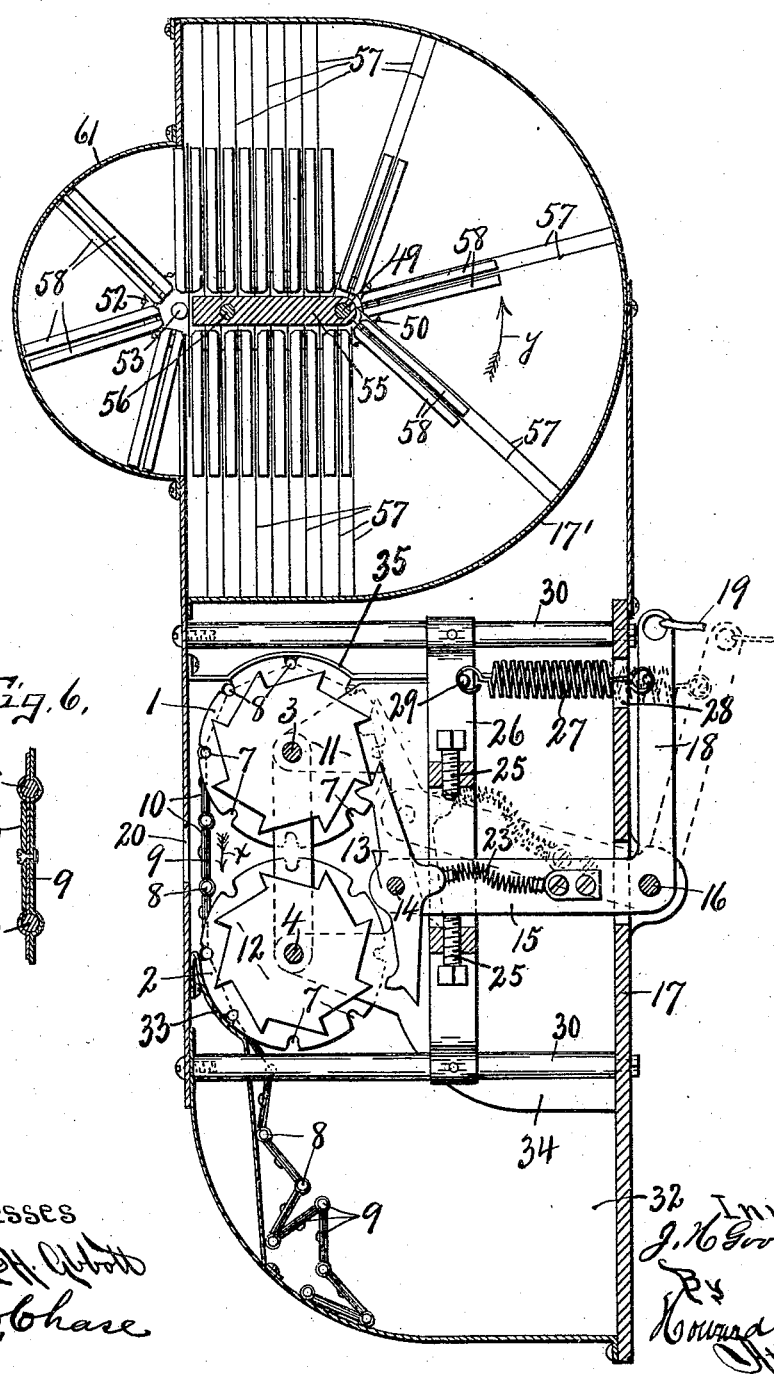

J. H. GOODIER.
COMBINED STREET INDICATOR AND ADVERTISING DEVICE.
APPLICATION FILED JULY 29, 1907.
940,963.
Patented Nov. 23, 1909.
4 SHEETS—SHEET 4.
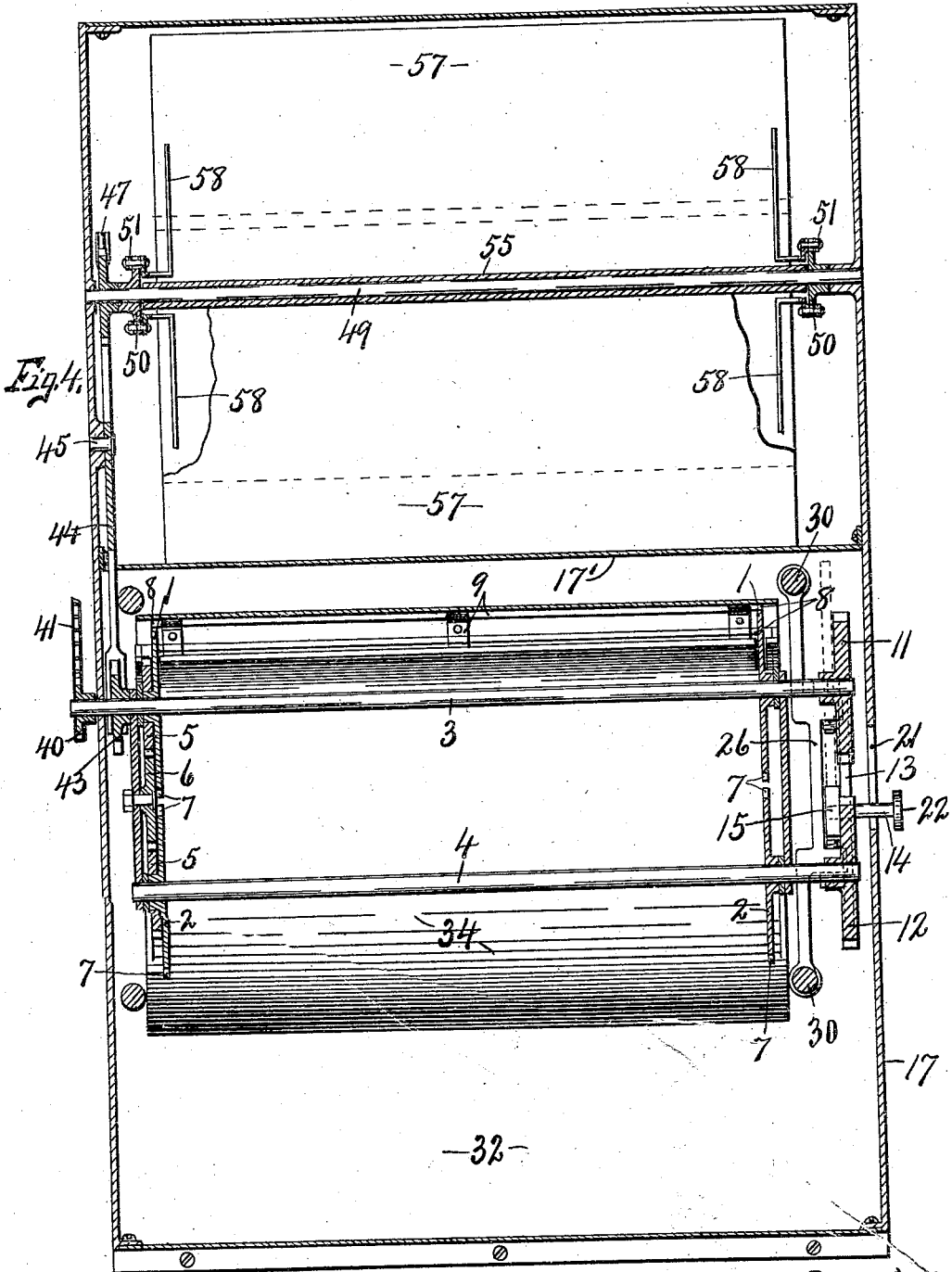

UNITED STATES PATENT OFFICE.

JAMES H. GOODIER, OF UTICA, NEW YORK.

COMBINED STREET-INDICATOR AND ADVERTISING DEVICE.

940,963.

Specification of Letters Patent.

Patented Nov. 23, 1909.

Application filed July 29, 1907. Serial No. 386,016.

*To all whom it may concern:*

Be it known that I, JAMES H. GOODIER, of Utica, in the county of Oneida, in the State of New York, have invented new and useful Improvements in Combined Street-Indicators and Advertising Devices, of which the following, taken in connection with the accompanying drawings, is a full, clear, and exact description.

This invention relates to a combined street indicating and advertising device for street cars adapted to be installed in some conspicuous place in or upon the car, usually in one end of such car where it is visible to the passengers, and may be easily operated by the motorman or other attendant to visually indicate successive streets as they are approached by the car, and at the same time to simultaneously bring into the view of the passengers placards or other advertising matter.

My object, therefore, is first; to install in the car a street indicator adapted to be operated at intervals by the motorman to visually indicate to the pasengers the several streets along the line of travel as they are successively approached; second, to provide an auxiliary, but somewhat smaller street indicator visible to the motorman, and brought into action by the operation of the main indicator so that the names of the streets appearing on the public indicator facing the interior of the car, are also displayed by the auxiliary indicator to the motorman, and third, to provide means brought into action by the operation of the indicator to successively display a series of placards or other advertising matter to the passengers.

Other objects and uses will be brought out in the following description.

In the drawings—Figure 1 is a front elevation, partly broken away, of a combined street indicator and advertising device embodying the various features of my invention. Figs. 2 and 3 are enlarged transverse vertical sectional views taken respectively on lines 2—2 and 3—3, Fig. 1, but looking in opposite directions. Fig. 4 is a longitudinal vertical sectional view taken on line 4—4, Fig. 2. Fig. 5 is an enlarged sectional view of the auxiliary street indicator. Fig. 6 is an enlarged sectional view of a portion of the apron showing the manner of fastening one of the name-plates thereto. Fig. 7 is a perspective view of one of the placard guides of the advertising attachment.

As previously indicated, this device comprises essentially a main or street indicating mechanism; an auxiliary or conductor's indicator, and an advertising mechanism, all of which mechanisms are brought into action by a single operating member under the control of the motorman or conductor, as will be hereinafter described.

The main or public street indicating mechanism comprises essentially a pair of reels —1— and —2— which are mounted upon shafts —3— and —4— respectively, and are connected for simultaneous action by suitable gears —5— and an idler —6—; each reel consisting of a pair of disks spaced some distance apart and secured to its respective shaft, the periphery of said disks being provided with suitable notches or recesses —7— for receiving studs or pins —8— of a traveling apron —9— which carries a series of plates —10— bearing the names of the streets in the line of travel of the car said name plates being detachably secured at their ends to the apron 9 by a removable clasp 10', Fig. 6. These clasps are in the form of an ordinary glove fastener which consists of two sections adapted to frictionally engage with each other. As this construction of fastener is so well known, it is thought unnecessary to specifically describe it.

The gears —5— are secured to one end of the reels —1— and —2— and at the opposite end of said reels are secured ratchet wheels —11— and —12— which are adapted to be engaged and operated by a double pawl —13— in a manner hereinafter described for rotating the reels —1— and —2— in opposite directions.

The pawl —13— is pivoted at —14— upon one end of a bell crank lever —15—, which in turn, is fulcrumed at —16— upon the main supporting case —17— and is provided with an external arm —18— to which is connected an operating cord —19— within easy reaching distance of the motorman or conductor, and whereby the lever may be rocked upon its fulcrum —16— to operate the pawl —13— and thereby rotate the reel which may be in operative connection with said pawl.

As best seen in Fig. 3, the double pawl —13— is pivoted intermediate its ends, and each end is equipped with a ratchet-engaging face, one of which is adapted to engage the ratchet wheel —11— when the pawl is rocked in one direction to move the apron in the direction indicated by arrow —X—, Fig. 3, while the other end of said pawl is adapted to engage the opposite or lower ratchet wheel —12— to move the apron in the opposite direction, the object of which is to bring the name-plates —9— successively into registration with a sight opening —20— in what may be termed, the front side of the casing —17—, or rather that side facing the interior of the car, so that the name-plates may be visible by the passengers through the sight-opening —20—.

The pawl —13— may be shifted by any desired means into and out of operative connection with either of the ratchet wheels —11— or —12—, and in the present instance, I have shown said pawl as secured to the pivotal pin or shaft —14— which extends laterally through a vertically elongated slot —21— in one side of the case, and is provided with a suitable hand-piece —22—, whereby said shaft may be rocked to throw opposite ends of the pawl alternately into operative connection with their respective ratchet wheels, said pawl being held in its adjusted position by a spring detent —23— best shown in Fig. 3.

The teeth of the ratchet wheels —11— and —12— and movement of the lever —15— and pawl —13— are arranged and adjusted so as to move the apron one name-plate space at a time, or at each operation of the lever —15— so as to bring said name-plates successively into registration with the sight-opening —20—, the movement of the lever —15— being limited by adjustable stops —25— which are mounted in a bracket —26— and whereby the movement of the pawl —13— and ratchet-wheel actuated thereby may be adjusted to a nicety to effect the desired step by step-movement of the apron bearing the name-plates.

After each operation of the lever —15— by the motorman or conductor through the medium of the cord —19— said lever is returned to its normal position by a spring —27— having one end secured to the arm —18— through an opening —28— in the adjacent side of the case —17— and its other end attached to a pin —29— on the bracket —26—, said bracket being supported upon tie-rods —30— connecting the front and back of the case.

When the pawl —13— is in the position shown in Fig. 3, to engage the teeth of the upper ratchet wheel —11— the operation of the lever —18— by the cord —19— against the action of the spring —27— operates to rotate the reel —1— to feed the apron or name-plate-carrier —9— in the direction indicated by arrow —x—, Fig. 3, the carrier being of sufficient length to receive a number of name-plates corresponding to the number of the streets in the line of travel of the car from one end of the route to the other, and inasmuch as the apron is jointed at the pins —8— they fold or collect in the bottom of a suitable chamber —32— and are guided thereinto by a deflector-plate —33— extending along a portion of the under front side of the lower apron-feeding reel —2—.

When the car reaches the end of the route, or its direction of travel is reversed, the pawl —13— is shifted by rotating the handpiece —22— out of engagement with the ratchet wheel —11— and into engagement with the ratchet wheel —12—, and as soon as the lever is released the spring —27— returns said lever to its normal position, and causes the pawl —13— to operate the ratchet wheel —12— and reel connected thereto to feed the apron —9— in the reverse direction, it being understood that motion is transmitted from the reel —12— to the reel —11— through the medium of the gears —5— and —6—. As the apron is thus fed in a direction opposite to that indicated by arrow —x—, the name-plates are successively brought into registration with the sight opening —20—, and the portion of the apron, together with the name-plates thereon, collect in a suitale receptacle —34—, as best seen in Fig. 2, said apron being held in contact with the upper side of the upper reel —1— and guided into the compartment —34— by means of a deflector-plate —35—, as shown in Figs. 2 and 3.

The apron and name-plates thereon travel between the flanges of the reels —1— and —2—, while the pins —8— which are secured to and form a part of the apron project beyond the name-plates and intermesh with the recesses or notches —7— in the peripheries of the flanges of the reels so that the apron is driven positively and intermittently at each operation of the lever —18—.

The casing —17— and mechanism inclosed thereby is usually placed in an opening in the front end of the car with the sight opening —20— facing the passengers so that the latter may be cognizant of the street which the car is approaching, but in some instances, it is advisable to acquaint the motorman with the names of the streets as they are successively approached, and for this purpose I provide an auxiliary motorman's street indicator adapted to be installed in the under side of the front end of the roof of the car, or in any other suitable locality where it may be visible by the motorman or conductor, consisting of a casing —37— and a rotary drum —38— bearing the names of the streets corresponding to those upon the apron 9, said casing having a sight opening —39— through which the names of the streets are visible as the drum —38— is rotated.

The action of the drum —38— is synchronized with the operation of the apron —9— so that the same street name which is presented at the opening —20— of the main indicator is also presented at the sight opening —39— of the auxiliary indicator, and in order to accomplish this synchrony of movement the shaft —3— is provided with a sprocket-wheel —40— which is connected by a chain —41— to a sprocket-wheel —42— on the shaft of the drum —38—.

The advertising device previously mentioned is always synchronized with the movement of the street indicating mechanism through the medium of a toothed wheel —43— and a lever —44—, said toothed wheel being secured to the shaft —3— while the lever —44— is fulcrumed at —45— and has one end provided with a roller —46—, which is engaged by the teeth of the wheel —43—, the opposite or upper end of said lever being provided with a pawl —47— which engages and rotates a ratchet wheel —48— on the shaft —49—. This shaft —49— is journaled at its ends in suitable bearings in the sides of the case —17—, as best seen in Fig. 4, and is provided near its ends or just inside of the bearings with sprocket-wheels —50— which are connected by chains —51— to additional sprocket-wheels —52— on a shaft —53— some distance in front of, but in the same horizontal plane as the shaft —49—.

A horizontal bed or table —55— is mounted upon the shaft —49— and a parallel rod —56— for supporting a series of advertising cards —57—, which are held between and carried forwardly in one direction by a series of card receivers or feeding arms —58—, the latter being arranged in pairs and secured at one end to the chains —51—, said table terminating a short distance from the shaft —53— to leave an intervening space or passage at the front edge of the table through which the cards drop by gravity into the lower side of the hood —17'— forming a part of the inclosing case. The rear side of this hood is concentric with the shaft —49— and extends from the front side of the case 17— rearwardly, upwardly, and forwardly some distance above the bed or table —55— so that the space between the under side of the bed and bottom of the hood 17'— is substantially the same as the distance between the top of the bed and underside of the top of the hood, and these spaces are substantially equal to the width of the cards which are carried by the arms 58. These arms, together with the sprocket-chain —51—, constitute a carrier movable in the direction indicated by arrow —y— for feeding the cards individually and consecutively from the front side of the hood 17'— rearwardly and upwardly from below the bed —55— to a position above said bed along which the carrier continues to feed said cards until they are successively registered with the front end of the bed —55—, or the space between said bed and shaft —53—, whereupon as each card is registered with such space, it drops by its own gravity therethrough and onto the bottom of the hood 17'— when the operation just described is repeated.

The front side of the casing —17— is provided with a sight opening —60— of substantially the dimensions of the card —57— which is visible therethrough to the passengers in the car.

The arms —58— of the advertising card-carrier project radially beyond the front side of the case in traveling from the underside around the front end and top side of the bed —55— and in order that they may be properly protected against contact with external objects, I provide a cap or cover —61—, one at each end of the carrier, where these arms are located, as best seen in Fig. 1.

The rear end of the bed —55— is concentric with and surrounds the shaft —49— so as to facilitate the travel of the cards around the rear side of the bed which forms a bearing for the lower edges of the cards while being moved by the arms —58— forwardly toward the guide opening between the front edge of the bed and shaft —53—, it being understood that the lower edges of the cards on the underside of the bed which are being carried rearwardly ride upon the bottom and rear lower side of the hood 17'—.

It will be evident upon reference to Fig. 2 that the actuating mechanism for the placard-carrier operates to move said carrier always in the same direction even when the direction of movement of the name-plate carrier is reversed, such movement of the placard carrier being effected by the rounding teeth of the wheel —43— acting upon the roller —46— of the lever —44—, the lever being retracted by a spring —65—, as best seen in Fig. 2.

It will now be seen that the simple operation by the motorman or conductor of the lever —18—, through the medium of the cord —19—, actuates the main street and auxiliary street indicating mechanism, and also the advertising mechanism and that the reverse action of the main and auxiliary street indicating mechanisms, is effected by merely shifting the pawl —13—; otherwise, the operation is believed to be clearly set forth in such clear and exact terms as to enable anyone skilled in the art to construct and operate the device.

What I claim is:

In a street indicator, a casing having a sight opening, reels journaled within the casing in planes above and beneath said sight opening, gears for transmitting positive rotation from one reel to the other, each reel being provided at its ends with a pair of disks having notches in their peripheries spaced equidistant apart, an apron having laterally projecting studs or pins engaging in the notches in the reels as the latter are rotated, name plates detachably secured to the apron between the axes of adjacent studs, said apron having disconnected ends, separate pockets in the casing for receiving the separate ends of the apron, guide plates for deflecting the ends of the apron from the reels into their respective pockets, separate ratchet wheels, each secured to one of said reels, a bell crank lever fulcrumed on the case and having one arm extending in close proximity to the ratchet wheels, operating means attached to the other arm of the lever for moving the latter in one direction, a retracting spring for said lever, a double pawl pivoted to the lever arm nearest the ratchet wheels and having its opposite ends movable into and out of engagement with their respective ratchet wheels, manually operated means for shifting said pawl, yielding means for holding said pawl in its shifted position, and adjustable limiting stops at opposite sides of the lever arm nearest the ratchet wheels for limiting the movement of said lever and pawl carried thereby.

In witness whereof I have hereunto set my hand this 26 day of July 1907.

JAMES H. GOODIER.

Witnesses:
 LETITIA BOWERS,
 W. L. GOODIER.